March 16, 1943.　　A. G. PETERS　　2,314,158
CONTROL VALVE
Filed March 10, 1942　　2 Sheets-Sheet 1
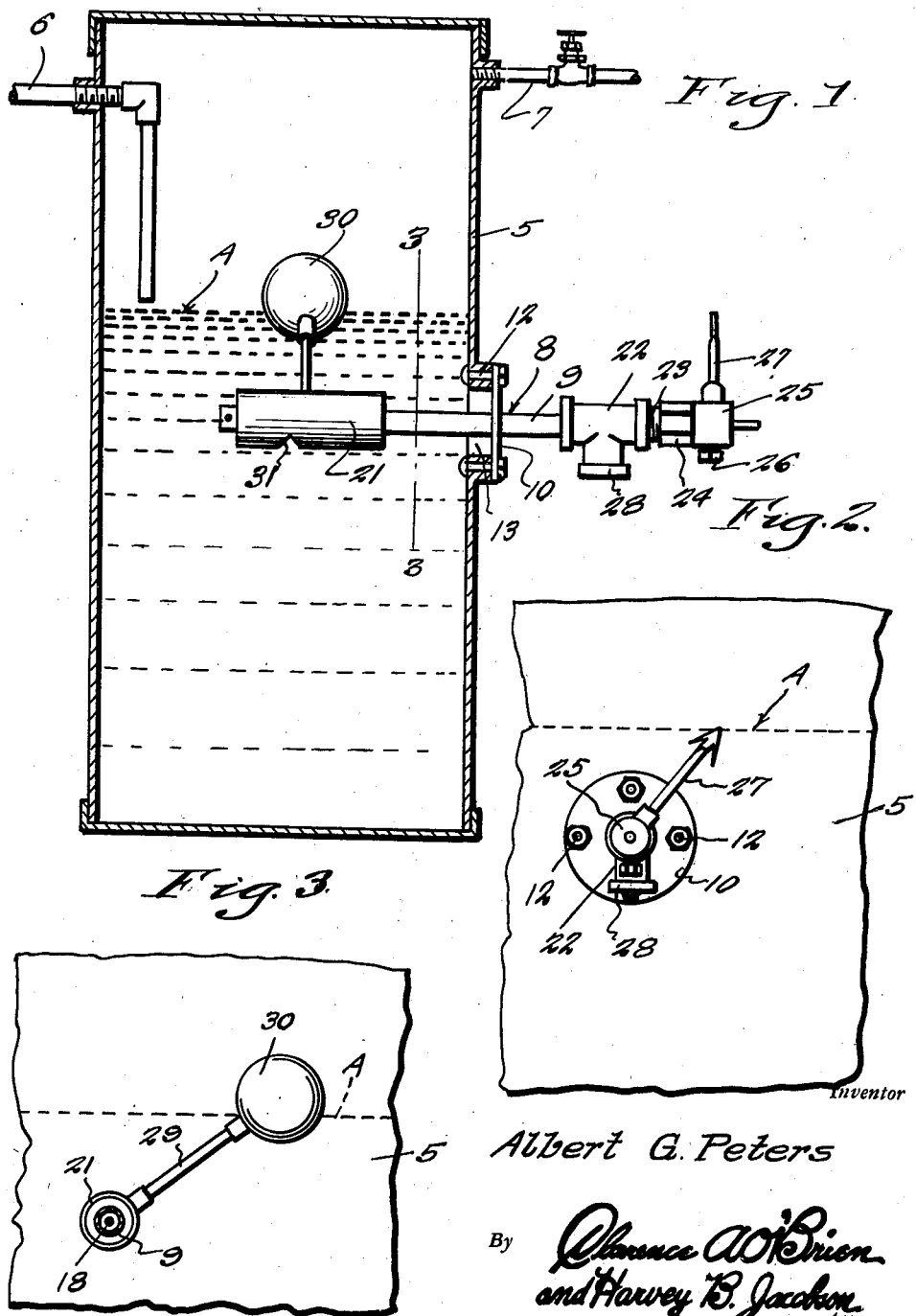
Inventor
Albert G. Peters
By Clarence A. O'Brien
and Harvey B. Jackson
Attorneys March 16, 1943.     A. G. PETERS     2,314,158
CONTROL VALVE
Filed March 10, 1942     2 Sheets-Sheet 2
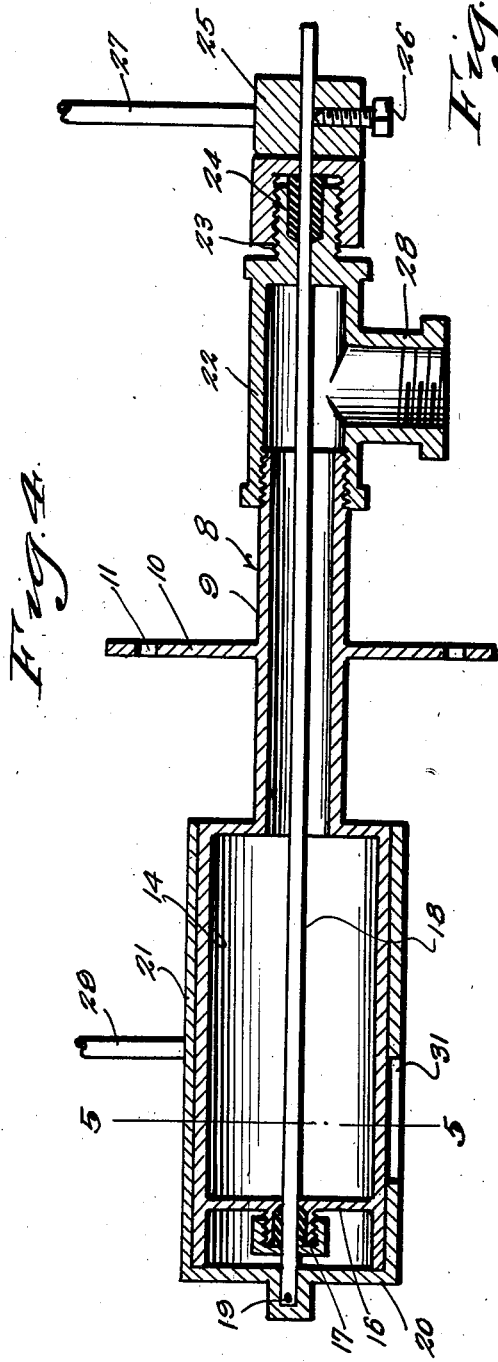
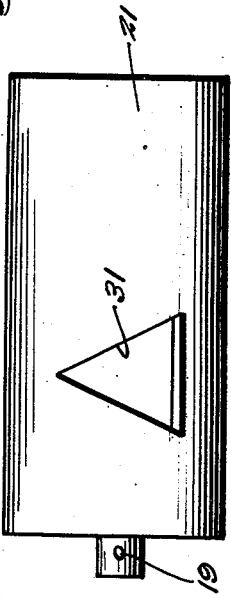
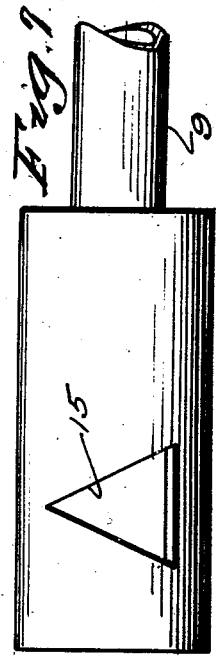
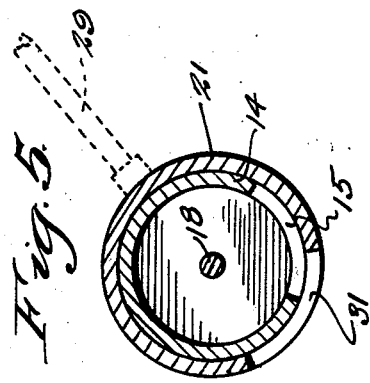
Inventor
Albert G. Peters

UNITED STATES PATENT OFFICE 2,314,158

CONTROL VALVE

Albert G. Peters, Powell, Wyo., assignor of one-third to Patrick Ernest Leimback and one-third to Byrne J. Manley, both of Powell, Wyo.

Application March 10, 1942, Serial No. 434,111

1 Claim. (Cl. 137—68)

This invention relates to new and useful improvements in control valves for liquid receptacle.

The principal object of the present invention is to provide a control valve for maintaining a definite predetermined liquid level such as in conjunction with gas and oil separators, to the exclusion of the passage of gas.

Other objects and advantages of the invention will become apparent to the reader of the following description.

In the drawings:

Figure 1 represents a vertical sectional view through the receptacle showing the control means.

Figure 2 is an outside elevational view showing the indicator.

Figure 3 is a section on the line 3—3 of Figure 1.

Figure 4 is an enlarged longitudinal sectional view through the control means.

Fig. 5 is a cross section on the line 5—5 of Figure 4.

Figure 6 is an elevational view of the rotatable sleeve.

Figure 7 is an elevational view of the internal cylinder.

Referring to the drawings wherein like numerals designate like parts, it can be seen that numeral 5 denotes a receptacle. This receptacle is closed and has a liquid and gas inlet pipe 6 and a gas escape pipe 7. The level of liquid in the receptacle 5 is maintained at a desired level A through the agency of control means generally referred to by numeral 8.

This control means includes an elongated conduit 9 having a circumferential flange 10 at its intermediate portion formed with openings 11 through which bolts 12 are disposed for securing the flange 10 over an opening 13 in the side of the tank 5. This conduit extends horizontally and has one end portion in the tank 5. This tank end of the conduit 9 has a cylinder 14 thereon and formed with a triangular-shaped opening 15 in the peripheral wall thereof.

Somewhat inwardly from the innermost end of the cylinder 14 is a partition 16 on which is a packing gland 17 and through this packing gland and longitudinally through the conduit 9 extends an indicator shaft 18, which at its inner end connects at 19 to the end wall 20 of a cylindrical sleeve 21 which snugly rotates on the cylinder 14.

At the outer end of the conduit 9 is a T-fitting 22 from which a nipple 23 extends and carried by this nipple is a packing gland 24. The shaft 18 extends through the packing gland 24 and has a collar 25 secured thereto by a set screw 26. An indicator hand 27 projects from the collar 25. Numeral 28 denotes the outlet of the T-fitting 22 for liquid.

Projecting laterally from the sleeve 21 is an arm 29 having a float 30 at its outer end.

Obviously it can be seen that as the float 30 rises to a certain level, the sleeve 21 will be rotated to a position removing a triangular-shaped opening 31 in the side wall thereof from the opening 15 in the cylinder 15. This prevents the flow of fluid through the control mechanism 8 and permits the level to build up in the receptacle 5.

When the desired elevation of the fluid level has been attained, the openings 15, 31 will have come into registration, allowing the liquid to flow from the receptacle 5 through the conduit 9 to the discharge T-fitting 22.

In this way the level can be maintained in the tank 5 so that no gas entering the receptacle 5 with the liquid by way of the inlet pipe 6 can reach the conduit 9, as the openings 15, 31 will always be a substantial distance under the level A of liquid.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a liquid level control, a receptacle for liquids, a liquid discharge conduit extending horizontally out of said receptacle and embodying an outer discharge end and an enlarged cylinder at its inner end opening thereinto, said cylinder having a bottom inlet opening, a cylindrical sleeve rotatable about said cylinder and having an opening therein for movement into and out of registration with said inlet opening under rotation of the sleeve in opposite directions, respectively, float operated means for rotating the sleeve, an indicator at the discharge end of the conduit, an indicator operating rod extending through said conduit and cylinder and having an end fixed to one end of the sleeve whereby rotation of the sleeve imparts rotation to the rod, and a partition in said cylinder between the inlet opening and said one end of the sleeve and having a packing gland therein through which the rod extends whereby liquid is prevented from leaking out of said cylinder between the same and said sleeve.

ALBERT G. PETERS.